United States Patent [19]

West

[11] Patent Number: 4,630,764

[45] Date of Patent: Dec. 23, 1986

[54] FIBER OPTIC CABLE CLEAVING TOOL

[76] Inventor: Fred D. West, 6800 Curry Dr. Box 32514, The Colony, Tex. 75056

[21] Appl. No.: 789,193

[22] Filed: Oct. 18, 1985

[51] Int. Cl.[4] .............................................. C03C 37/16
[52] U.S. Cl. ........................................ 225/2; 225/96.5
[58] Field of Search ...................... 225/2, 93, 96, 96.5, 225/101, 103

[56] References Cited

U.S. PATENT DOCUMENTS 4,315,584  2/1982  Wuestner ................................. 225/2
4,463,886  8/1984  Thornton ............................ 225/96.5

Primary Examiner—Frank T. Yost
Assistant Examiner—Hien H. Phan
Attorney, Agent, or Firm—Saul Elbaum; Alan J. Kennedy; Anthony T. Lane

[57] ABSTRACT

A device for cleaving fiber optic cable includes a grooved drum about which a cable is reeved mounted on a base which includes clamps for the cable ends. A cleaving break is provided beneath a section of the cable in the periphery of the drum which is expandable to vary the cleaving break dimensions. In the cleaving break is mounted a device for circumferentially scoring the cable which is then cleaved at the score mark by forcibly expanding the drum and thus the size of the cleaving break. Mechanism is provided for effecting such expansion.

6 Claims, 5 Drawing Figures

FIBER OPTIC CABLE CLEAVING TOOL

FIELD OF THE INVENTION

This invention relates to means and apparatus for mounting and cleaving cable formed from brittle optical rods or fibers such that high quality end connectors and splices can be made by personnel in the field.

BACKGROUND OF THE INVENTION

There is need for optical fiber cable cleaving apparatus designed to be used efficiently by non-technical personnel for field preparation of flat smooth end faces of fiber optic cables for making high quality connectors or splices.

It is, therefore, an object of the present invention to provide a cleaving tool for field use which attains accurately cleaved fiber ends with a minimum of tool complexity.

PRIOR ART DEVICES

Many prior art devices, methods and apparatus have been developed, but none of such methods and apparatus have proved to be sufficiently durable and foolproof during field fabrication as the present novel means and apparatus. For example, many such prior art flexible plate mechanisms for imparting bending stress to optical fiber cable after a scoring mark has been made on the periphery of the cable to effect a break at that scoring mark. These types of mechanism fail to attain the true end surfaces required at the break points for subsequent incorporation into low loss connections and splices.

Other devices utilize circumferential scoring which is preferable but have mechanisms which are too cumbersome or complex for field use.

Single score mark devices in which subsequent stress such as axial bending and tension is used to cleave optical fibers at the score mark are illustrated in the following U.S. Pat. Nos.: 3,934,773, Chinnock et al, 1/27/76; 4,029,390, Chinnock et al, 6/14/77; 4,322,025, Johnson, 3/30/82; 4,154,395, Lewis, 5/15/79; 4,257,546, Benasuitti, 3/24/81; 4,168,026, Lukas et al, 9/18/79; 4,159,793, Belmonte et al, 7/3/79; 4,229,876, Doty, 10/28/80.

The use of circumferential scoring but without the specific structural features of the present invention is illustrated in the following U.S. Pat. Nos.: 4,203,539, Miller, 5/20/80; 4,216,004, Brehm et al, 8/5/80.

SUMMARY OF THE INVENTION

Generally, the present invention relates to apparatus for mounting and cleaving fiber optic transmission rods or cables in field preparation of such fiber optic cables and the like for producing high quality connectors or splices. Particularly, the apparatus includes a novel fiber optic cable cleaving apparatus wherein the cable is reeved about a hoop over a cleaving gap defined therein between coacting cleaving arms, while held in a taut condition between retainers placed apart on a base supporting the hoop. A rotatable scoring member is mounted on the hoop at the cleaving arms so as to effect circumferential scoring of the cable in the cleaving gap. Once scoring is effective, the cleaving arms are adjustably expanded at the cleaving gap to break the tautly held cable and thus provide proper end surfaces thereon for subsequent incorporation into connectors and splices.

DETAILED DESCRIPTION OF THE DRAWINGS

Figure 1:
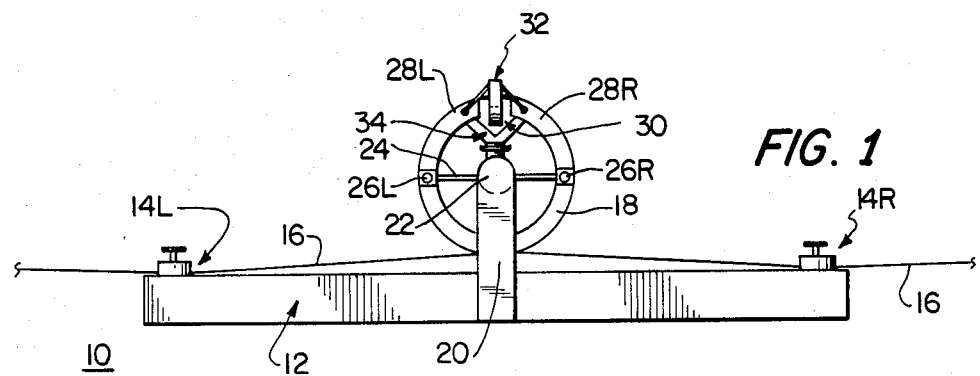
FIG. 1 shows a side elevation of the assembled elements of the optical fiber cable cleaving tool of the present invention.

Referring in detail to the drawings and with particular reference to FIG. 1, the fiber optic cable cleaving tool 10 of the present invention is shown as comprising a base member 12, having left and right extremities at which left and right cable retaining clamps 14L and 14R, respectively, are positioned to receive therethrough a fiber optic cable 16.

The cable 16 is reeved about a stainless steel drum in a helical V groove about the periphery thereof, as will be hereinafter more fully described with reference to FIG. 3. The stainless steel drum 18 is mounted on an upstanding supporting arm 20 by means of an axial center bar 22 and diametric strut 24 which extends from the axial support rod 22 outboard to positions defined by left and right swing pins 26L and 26R diametrically opposed on the lower half of the stainless steel hoop 18.

Extending from the left and right swing pins 26L and 26R, respectively, are left and right arcuate cleaving arms 28L and 28R which substantially subtend 90° of arc with the exception of a cleaving break defined therebetween substantially vertically above the axial supporting rod 22. The cable 16 extends across the cleaving break 30 adjacent a scoring mechanism 32, to be hereinafter more fully described with reference to FIGS. 3 and 4. The cleaving arms 28L and 28R are maintained in position to define the cleaving break 30 by means of a raker assembly 34 which supports the arms in an adjustable fashion such that the cleaving break 30 can be changed in dimension to effectuate cleaving of the cable stretched thereacross subsequent to scoring of that cable by the scoring mechanism 32. The breaker assembly 34 will be more fully described with reference to FIG. 5.

Figure 2:
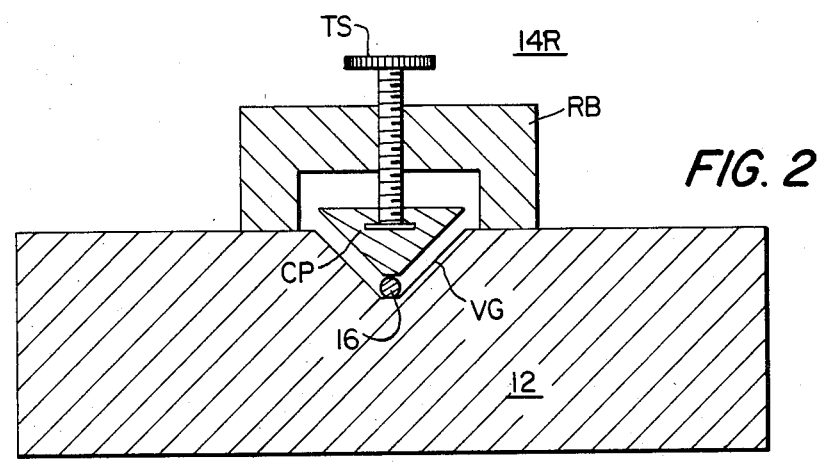
FIG. 2 is a detailed partial end view of the support base and a cable retainer mechanism of the present invention.

The right-hand retainer mechanism 14R is shown in detail in FIG. 2 as including a thumbscrew retainer block RB, an adjustable thumbscrew TS extending downward through the retainer block RB and having a rotating cable engaging pad CP at the lower end thereof cooperating with a V groove VG in the base unit 12 to receive and clamp between the pad CP and the inner walls of the groove VG the optic fiber cable 16.

The left-hand cable retainer assembly 14L is substantially identical and disposed at the opposite end of the base 12 of the cleaving tool 10.

Figure 3:
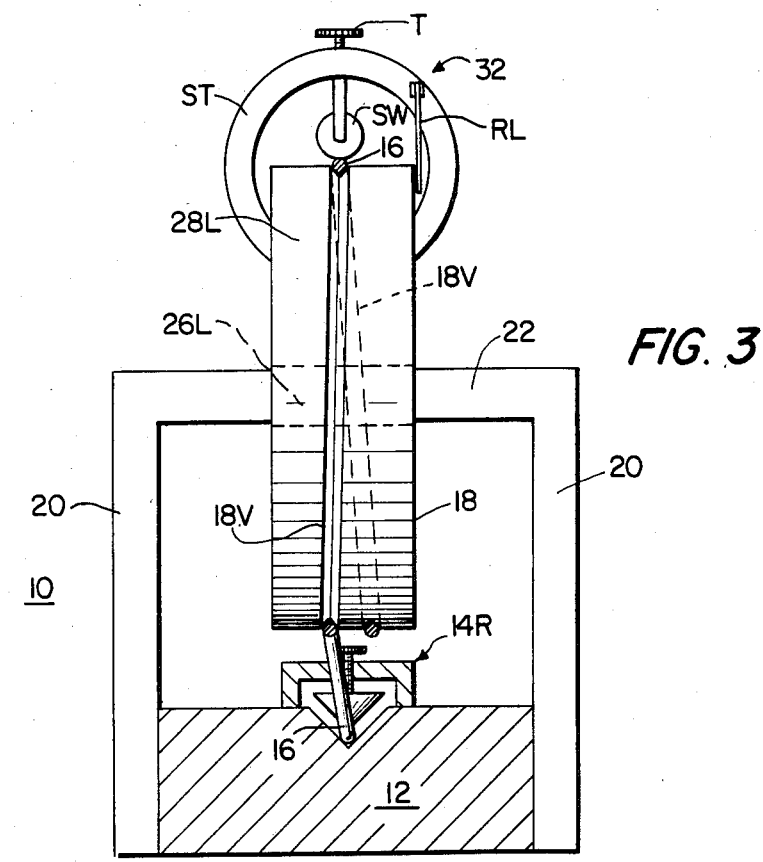
FIG. 3 is a detailed end view in partial cross sections showing the scoring mechanism and one of the cable retainer mechanisms of the present invention.

Referring in detail to FIG. 3, the stainless steel hoop 18 with the helically disposed V groove 18V therein is shown in end view as mounted on the axial support rod 22 and upstanding support arms 20 such that the cable 16 may be reeved therearound and extend across the cleaving break (not shown in FIG. 3) beneath the scoring wheel SW of the scoring mechanism 32.

The scoring wheel SW is mounted in a circular shuttle track ST such that it may be rotated circumferentially about the cable 16 and cleaving break 30 to place a complete circumferential score about the cable 16 to enhance clean breaking thereof.

Figure 4:
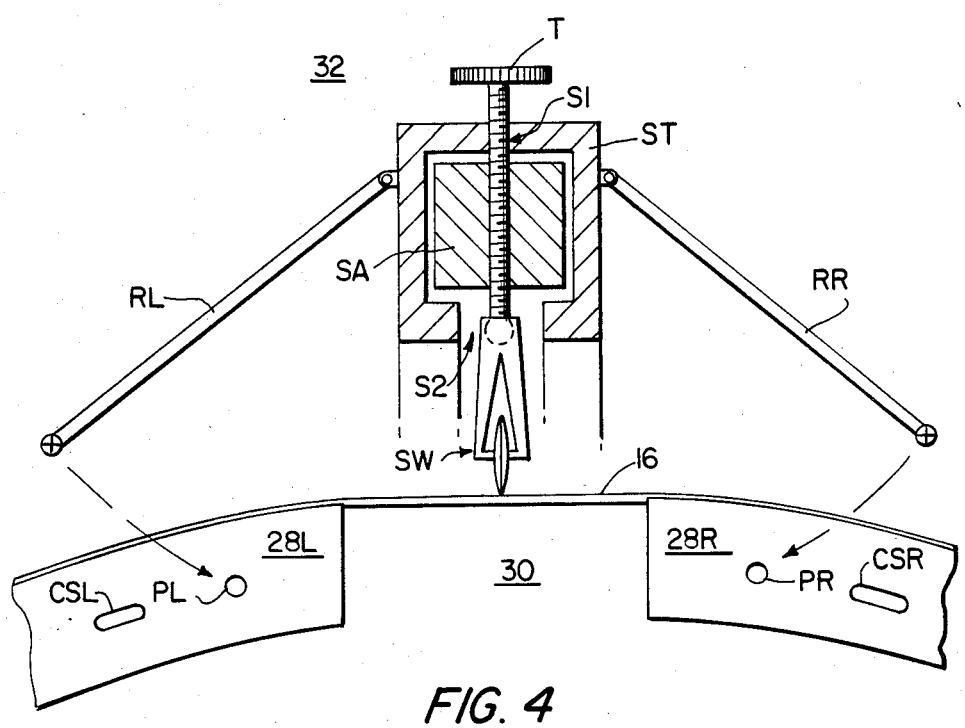
FIG. 4 is an enlarged partial end view of the cleaving arms showing the cleaving break therebetween and illustrating the attachment thereto of the scoring mechanism of the present invention.

With reference to FIG. 4, the scoring wheel SW is shown positioned adjacent to cleaving break 30 between the left and right cleaving arms 28L and 28R by means of left and right retainer arms RL and RR, respectively, mounted on pins PL and PR on the left and right cleaving arms 28L and 28R on opposite sides of the cleaving break 30. These retainer arms RL and RR maintain the shuttle track ST of the scoring assembly 32 in position circumferentially of that portion of the optic fiber cable 16 extending across the cleaving break 30 so that the scoring wheel SW which is mounted on a shuttle assembly SA in the shuttle track ST can be moved circumferentially about the cable 16 to completely score it about its periphery.

The shuttle track ST may be of any suitable configuration in conjunction with support arms RL and RR which are generally schematic of any suitable assembly structure, such that 360° motion of the shuttle assembly SA together with a complete circumferential motion of the scoring wheel SW can be effected about that portion of the optic fiber cable 16 extending across the cleaving brake 30. The shuttle track ST can be for example a pair of rings having an upper slot S1 for receiving the adjusting thumbscrew T and the lower slot S2 through which the adjusting thumbscrew extends below the shuttle SA to permit the entire shuttle assembly SA carrying the thumbscrew T and the scoring wheel SW to be rotated 360° about that portion of the cable 16 within the cleaving break 30 and thereby completely circumferentially score the periphery of the optic fiber cable 16.

Figure 5:
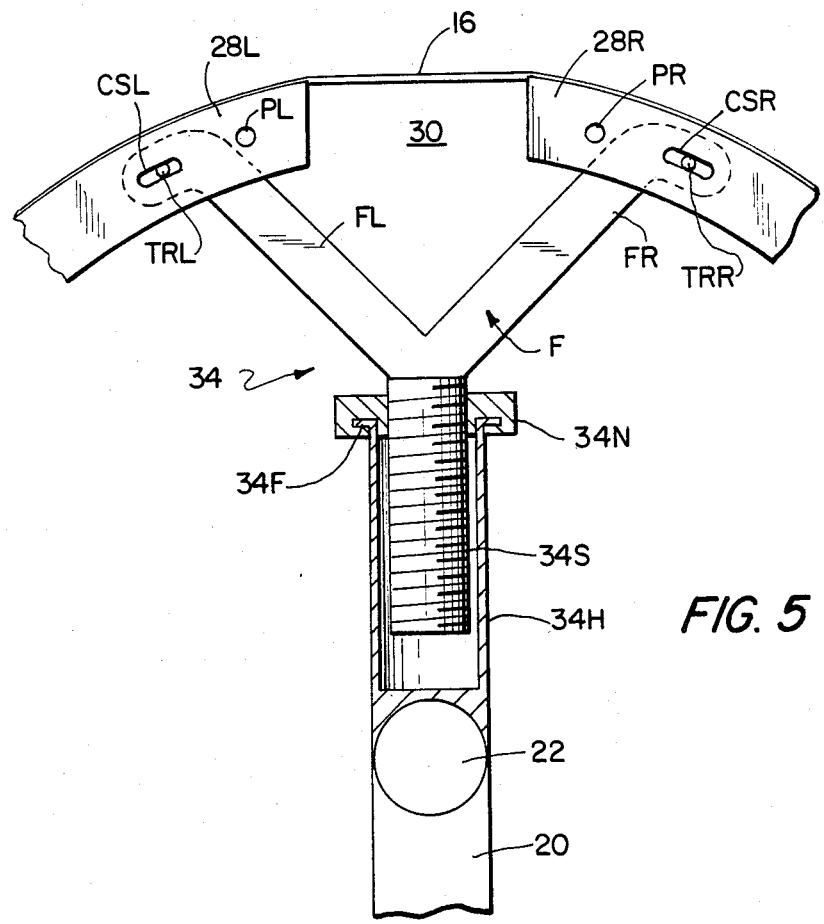
FIG. 5 is an enlarged detail of the cable breaker assembly and the connections thereof with the respective cleaving arms.

Referring next to FIG. 5, the breaker assembly 34 is shown as including a Y-shaped fork F having left and right arms FL and FR which are connected to suitable trunions TRL and TRR on the left and right cleaving arms 28L and 28R, respectively. The ends of the breaker arms FL and FR contain cam slots CSL and CSR, respectively, which cooperate with the trunions TRL and TRR to force the cleaving arms 28L and 28R upward and outward to expand the width of the cleaving break 30 and snap the cable 16 which has been pre-scored by the scoring wheel SW as previously described.

The Y-shaped fork F is constrained to move vertically by means of an adjustment nut 34N which cooperates with the threaded lower shank 34S of the Y-shaped fork F in the provision of a piston-like assembly extending upward from the axial support rod 22 on the supporting bar 20. The threaded shank 34S of the Y-shaped fork F is enclosed in a tubular housing 34H which has a top flange 34F cooperating with the adjustment nut 34N to prevent vertical movement of the nut such that upon rotation of the nut 34N the threaded shaft 34S is forced up or down, as the case may be, thereby constraining the Y-shaped fork F and the left and right breaker arms FL and FR to follow the vertical movement. This controls the pivotal motion of the left and right cleaving arms 28L and 28R, respectively, about the swing pins 26L and 26R in the hoop structure 18 to thereby selectively apply additional tension and breaking force to a pre-scored section of the cable 16 at the cleaving break 30.

OPERATION OF THE INVENTION

Referring to FIGS. 1 through 5, a fiber optic cable 16 is threaded through the right-hand retainer mechanism 14R and reeved about the stainless steel drum 18 in the V groove 18V thereof and through the shuttle track ST beneath the scoring wheel SW across the cleaving break 30 and thence back beneath the hoop 18 and out through the left-hand retainer clamp 14L. The right-hand retainer mechanism is tightened and the cable is pulled taut about the hoop 18 and then the left-hand retainer clamp 14L is tightened to maintain that tension in the cable 16.

Following this securing of the cable 16 across the cleaving break 30, the thumbscrew T in the scoring assembly 32 is tightened down until the scoring wheel SW penetrates the sheath or insulating medium surrounding the cable 16 and the scoring wheel SW tends to penetrate or score the surface of the fiber optic in the cable 16. At this point, the entire shuttle assembly SA is rotated with the thumbscrew T and the scoring wheel SW 360° about the cable 16 to thereby circumferentially score the periphery of the cable.

At this point in time the scoring wheel is backed off of the cable by the thumbscrew T and the entire scoring mechanism 32 is removed by release of the support arms RL and RR from the mounting pins PL and PR on the cleaving arms 28L and 28R.

The breaker assembly 34 is then energized by turning the adjustment nut 34N about the flange 34F to force the Y-shaped fork F and the breaker arms FL and FR upward which causes a corresponding upward and outward movement of the left and right cleaving arms 28L and 28R and a widening of the cleaving break 30 thereby placing the scored cable 16 in tension and causing it to break at the point of scoring leaving a clean face on the fiber optic within the cable.

Thus, as can be seen from the foregoing description, the present invention provides a fiber optic cable cleaving tool having novel scoring mechanism, breaker assembly, cleaving arm and hoop assemblies in a combination which provides for high quality faces in field cleaved fiber optic cable to enhance the quality of transmission in connectors and splices.

It should be understood that the invention described herein may be modified as would occur to one of ordinary skill in the art without departing from the spirit and scope of the present invention.

What is claimed is:

1. The method of cleaving optical fibers to achieve substantially flat-end surfaces at a desired point of cleavage comprising the steps of:
    (a) reeving the optical fiber to be cleaved around a drum having a peripheral cleaving break therein with the optical fiber spanning said cleaving break;
    (b) circumferentially scoring said optical fiber at the desired point of cleavage within said cleaving break; and
    (c) expanding the size of said cleaving break by changing the curvature of said drum to thereby tension said optical fiber and effect a cleavage therethrough at the circumferentially scored point of cleavage.

2. The method of claim 1, which further includes fixing two ends of the optical fiber extending outboard of said drum prior to scoring and cleaving said optical fiber.

3. Means for cleaving fiber optic cables comprising:
drum means for receiving fiber optic cable in reeved configuration;
base means for mounting said drum means;
clamp means on said base means for clamping the opposite ends of said fiber optic cable reeved on said drum means to said base means;
a cleaving gap defined in the periphery of said drum means by first and second arcuate peripherally disposed cleaving arm means extending from diametrically opposed pivot positions on the periphery of said drum means to positions defining the boundaries of said cleaving gap;
said optic fiber cable being reevable on said drum means to span said cleaving gap;
scoring means mounted on said drum means at said cleaving gap for circumferentially scoring a said fiber optic cable spanning said cleaving gap; and
cleaving means on said drum means for cleaving a circumferentially scored fiber optic cable spanning said cleaving gap by engaging said cleaving arm means and selectively rotating said cleaving arms means about said pivot positions to enlarge said cleaving gap.

4. The means for cleaving fiber optic cables of claim 3, wherein said scoring means is removably mounted on said cleaving arm means within said cleaving gap.

5. The means for cleaving fiber optic cables of claim 3, wherein said drum means includes a helicoidal peripheral groove defined therein for receiving a said fiber optic cable reeved on said drum.

6. The means for cleaving fiber optic cables of claim 3, wherein said scoring means is removably mounted on said cleaving arm means within said cleaving gap; and wherein said drum means includes a helicoidal peripheral groove defined therein for receiving a said fiber optic cable reeved on said drum.

* * * * *